No. 49,798. PATENTED SEPT. 5, 1865.
J. SHAW.
DRILL FOR ARTESIAN WELLS.

Witnesses,
Theo Tusch
C. L. Topliff

Inventor
J. Shaw
By Munn & Co
attys

UNITED STATES PATENT OFFICE.

JEHYLEMAN SHAW, OF BRIDGEPORT, CONNECTICUT.

IMPROVEMENT IN DRILLS FOR ARTESIAN WELLS.

Specification forming part of Letters Patent No. 49,798, dated September 5, 1865.

*To all whom it may concern:*

Be it known that I, JEHYLEMAN SHAW, of Bridgeport, in the county of Fairfield and State of Connecticut, have invented a new and useful Improvement in Drills for Artesian Wells; and I do hereby declare that the following is a full, clear, and exact description thereof, which will enable those skilled in the art to make and use the same, reference being had to the accompanying drawings, forming part of this specification, in which—

Figure 1:
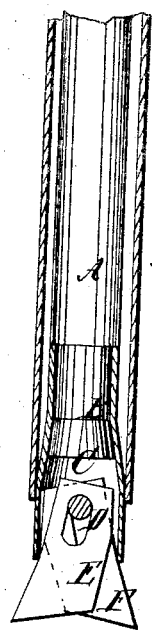
Figure 2:
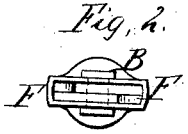

Figure 1 is an axial section of a drill made according to my invention. Fig. 2 is a plan view.

Similar letters of reference indicate like parts.

The object of this invention is to bore and cut through the bowlders which are often found in the path of the soil-pipe when the latter is being driven down to the surface of the rock; and it consists in an expanding drill, which is operated within the soil-pipe. When it is drawn upward the cutters fall together, and become contracted to a compass less than the diameter of the pipe; but when it is forced downward and strikes a stone or any other hard object below the end of the pipe its cutters are forced outward in radial directions to a diameter greater than the pipe, and they therefore cut a path for the pipe through the obstruction.

A designates the stock of the drill, and B the socket within which the cutters vibrate. The socket in this example is made distinct from the upper part of the stock; but they may be made in one piece, in which case a socket must be cut in the end of the stock.

D is the bolt on which the cutters vibrate. It works through elongated holes cut in the shanks of the cutters, so that when they are pushed upward, or rather when the socket moves down over them, the bottom C of the socket will strike against the upper ends of the cutters, and so preserve them from striking on the bolt. The faces of the cutters are at an obtuse angle with the direction of their length, and their outer sides at the bottom are extended a little outward, so as to widen that part of the cutters which is below their slots. This construction enables the cutters to expand when they strike any object on their descent, their faces being compelled by the weight of the tool to move outward, their points striking and moving outward, so as to enlarge the diameter of the cut they are making, and making what may be called a "drawing cut" on the object they strike against. When the tool is drawn upward within the soil-pipe its cutters fall into the same straight line, and they are then of less diameter than its internal diameter. The tool is operated within the soil-pipe, and its stock and socket are of such dimensions as to work easily within the same. When in driving the pipe its end comes upon a bowlder which will not yield before it this drill is applied, and it is evident that since its cutters only expand when they strike the object below the end of the soil-pipe they will gradually bore a path for the pipe and let it sink down through such bore as fast as the detritus is removed by the said pump.

I claim as new and desire to secure by Letters Patent—

A drill for boring a path for the soil-pipe through bowlders and other hard objects which obstruct the descent of such pipe, constructed and operated substantially as above shown.

JEHYLEMAN SHAW.

Witnesses:
M. M. LIVINGSTON,
C. L. TOPLIFF.